United States Patent

[11] 3,554,275

[72] Inventor William J. Schade Jr.
 Tustin, Calif.
[21] Appl. No. 795,785
[22] Filed Feb. 3, 1969
[45] Patented Jan. 12, 1971
[73] Assignee to the United States of America as
 represented by the Secretary of the Navy

[54] GASEOUS LASER COOLING SYSTEM
 9 Claims, 2 Drawing Figs.
[52] U.S. Cl. .................................................. 165/156,
 313/44; 331/94.5; 165/180
[51] Int. Cl. ........................................................ F28d 7/00
[50] Field of Search ........................................... 165/156,
 163, 184, 133; 313/44; 331/94.5,
 (Inquired)(Bauer Digest); 330/4.3(Inquired)

[56] References Cited
 UNITED STATES PATENTS
 2,122,521 7/1938 Goddard .................... 165/180X
 2,287,066 6/1942 Rogers ........................ 165/184X
 2,934,674 4/1960 Wertman .................... 313/44X
 3,243,715 3/1966 Welton ........................ 330/4.3
 3,446,032 5/1969 Bottum ........................ 165/156X Primary Examiner—Martin P. Schwadron
Assistant Examiner—Theophil W. Streule
Attorneys—E.J. Brower and J.M. St. Amand ABSTRACT: A system for the removal of thermal energy from nonmetallic material which forms the boundary of a gaseous laser.

PATENTED JAN 12 1971

3,554,275

WILLIAM J. SCHADE JR
INVENTOR.

BY J. M. St. Amand
ATTORNEY

GASEOUS LASER COOLING SYSTEM

The invention herein described may be manufactured and used by or for the Government of the United States of America for governmental purposes without the payment of any royalties thereon or therefor.

BACKGROUND OF THE INVENTION

Recent advances in laser technology make use of gaseous lasers, such as $CO_2$ lasers, practical for communications. Cooling of the laser tube is an essential requirement for most laser applications. Communication applications of gaseous $CO_2$ lasers require highly stable, single frequency oscillation, and this will depend greatly on the temperature stability of the laser tube which is made of glass or fused silica. Higher gain (radiated intensity) can be achieved in a laser with reduced operating temperatures.

Previously, pipes and laser tubes of nonmetallic materials such as Corning Pyrex glass, Corning Vycor, fused silica, or quartz were enclosed in a cylinder so that water or some suitable coolant could be circulated around the outside of the inner tube which contained the heat source. Typically, the source of heat is an electric discharge in a gas to produce an amplifying medium for use in a laser.

Previous methods depended on the thermal conductivity, heat capacity, and the volume rate of flow of the coolant. Water is the commonest coolant, but it has a relatively low thermal conductivity. The large volumes generally used for the cooling chamber, between the inner and outer tubes, result in a reduced rate of flow of the coolant and increased temperatures at the outer wall of the inner tube. The flow pattern is nonuniform around the inner tube so a nonuniform temperature distribution is established resulting in the inner tube being distorted unevenly.

The present invention is for the removal of thermal energy (heat) from a nonmetallic material which forms the boundary of a source of thermal energy as in a gaseous laser tube.

The use of high thermal conducting materials to transport heat to the coolant which has high thermal capacity, and the use of higher volume flow-rates of coolant through the system provides a lower steady-state temperature for the boundary of the source of heat, and also provides on the outer boundary of the nonmetallic enclosure a uniform temperature distribution which is necessary for mechanical stability in laser applications which require stable oscillation frequencies.

Other objects and many of the attendant advantages of this invention will become readily appreciated as the same becomes better understood by reference to the following detailed description when considered in connection with the accompanying drawings wherein.

Figure 1:
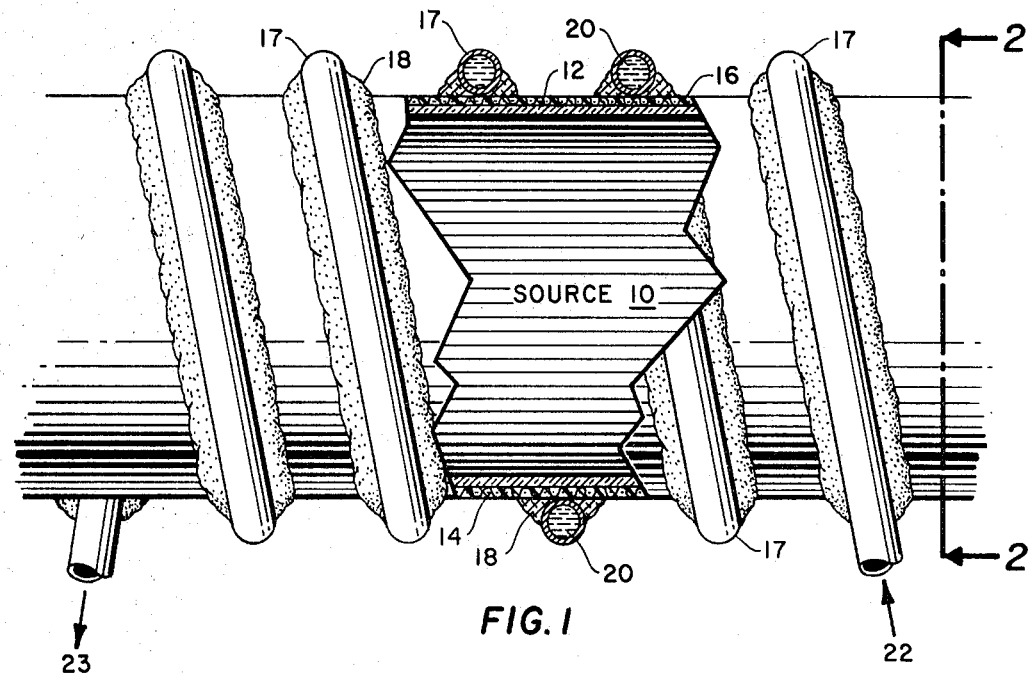
FIG. 1 is a sectional illustration of a laser tube cooling system of the present invention.
Figure 2:
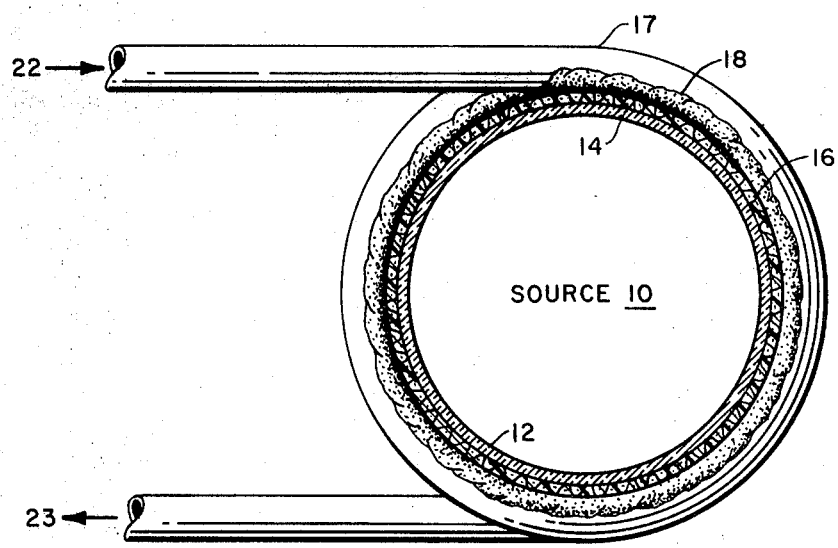
FIG. 2 is an illustration taken along line 2-2 of FIG. 1.

This invention provides conductive cooling of nonmetallic materials in the following manner and as depicted in FIG. 1 of the drawing. A source of thermal energy 10 such as a gaseous laser located within tube 12 must be dissipated to avoid overheating the source and the boundary of the container. Nonmetallic boundary 12 is typically a glass, quartz, or fused silica pipe or tube which contains the source of thermal energy and separates laser electrodes for an electric discharge in a gas. The geometry, and dimensions of tube 12 are determined by the specific application. A screen or mesh 14 which is in contact with the outer boundary of tube 12 is of material having a high thermal conductivity such as copper, for example. A plane sheet of screen mesh 14 is wrapped tightly around tube 12 and the edges laced together where they meet providing a conductive jacket which also gives added strength about tube 12. Bonding mixture 16 composed of material having a high thermal conductivity is used to bond mesh 14 to the outside of tube 12. The composition of bonding mixture 16 is a high concentration of powdered material (such as $Al_2O_2$ for dielectric applications or copper dust for metallic applications, for example) mixed in a vehicle such as paint or varnish (General Electric 0 7031 adhesive and Insulating Varnish, for example) which can be spread over and through conducting mesh 14. A length of copper tubing 17 is wrapped around the tube and mesh assembly and is held in contact with mesh 14 and bonding mixture 16 by an adhesive material 18 which is also a good thermal conductor (such as Devcon F-2 which is 80 percent aluminum and 20 percent plastic). The coolant 20 such as water, flows into the copper tubing at 22 and out at 23. Copper tubing 17 is wound about tube 12 as close or as far apart as desired. In operation, heat from the source at 10 is conducted through the tube 12 into the copper mesh 14 and bonding mixture 16. Mesh 14, bonding mixture 16 and adhesive material 18 conduct the heat to copper tubing 17. The coolant 20 flowing through copper tubing 17 rapidly and continuously transports the heat away from the system. This system has a dual purpose. When the copper tubing 17 is wrapped around a cylinder tube 12 in the form of a coil, a current can also be passed through coil 17 to establish an internal magnetic field for influencing the laser. This is done when bonding mixture 16 is a dielectric and does not electrically connect copper tubing 17 with the copper screen or mesh 14.

Where tube 12 is of irregular shape, copper screen or mesh 14 can readily be formed about such irregular shape in thermal contact with the surface of the glass tubing.

As an alternative method of construction, copper foil rather than a mesh or screen 14 can be adhered to the glass tube wall 12 with a thin film of adhesive and copper tubing 17 for coolant 20 can be soldered or bonded to the foil as desired.

I claim:

1. The combination of a gaseous laser tube having a cooling system integral therewith for removal of thermal energy and provide an outer boundary of uniform temperature distribution necessary for mechanical stability in laser applications which require stable oscillation frequencies, comprising:
    a. a tube of dielectric material which houses and forms the boundary of a high thermal energy laser source, said dielectric material being selected from glass, quartz and fused silica;
    b. a sheet of highly thermally conductive metallic material wrapped tightly about and covering the outer boundary of said dielectric tube;
    c. said sheet of highly thermally conductive metallic material bonded to the outside of said dielectric tube with a high thermally conductive bonding material;
    d. a length of coolant tubing having good thermal conductivity wrapped about said tube covered with said sheet of highly thermally conductive metallic material and said bonding material;
    e. said coolant tubing being fastened about said dielectric tube and metallic wrapping with an adhesive material of good thermal conductivity; and
    f. said coolant tubing capable of having high volume flow of coolant liquid passed therethrough for rapidly and continuously conducting heat away from the system and providing a uniform temperature distribution on said tube of dielectric material.

2. A system as in claim 1 wherein said sheet of highly thermally conductive metallic material is a metal mesh.

3. A system as in claim 1 wherein said sheet of highly thermally conductive metallic material is a metal foil.

4. A system as in claim 1 wherein said high thermally conductive bonding material is $Al_2O_2$ mixed with an insulating adhesive.

5. A system as in claim 1 wherein said highly thermally conductive material is copper dust mixed with and insulating varnish.

6. A system as in claim 1 wherein said coolant tubing is made of copper.

7. A system as in claim 1 wherein said coolant tubing is fastened about said tube with an adhesive of 80 percent aluminum dust and 20 percent plastic.

8. A system as in claim 1 wherein said coolant tubing coiled about said tube is electrically conductive and said bonding material is dielectric, and a current passed through said coil of coolant tubing will establish an internal magnetic field for influencing the laser within said dielectric tube.

9. A system as in claim 1 wherein said sheet of highly thermally conductive metallic material is of copper.